United States Patent [19]

Dodd

[11] 4,044,804
[45] Aug. 30, 1977

[54] TREE SHEARER

[75] Inventor: Wesley Lamar Dodd, Hamilton, Ga.

[73] Assignee: Deere & Company, Moline, Ill.

[21] Appl. No.: 588,770

[22] Filed: June 20, 1975

[51] Int. Cl.$^2$ .............................................. A01G 23/08
[52] U.S. Cl. .................................. 144/34 E; 30/246;
56/246; 83/928; 144/3 D
[58] Field of Search ................. 83/591, 564, 595, 596,
83/928; 30/237, 238, 246, 249; 56/27.5, 246;
144/3 D, 34 R, 34 E, 34 F, 309 AC

[56] References Cited

U.S. PATENT DOCUMENTS

| | | | |
|---|---|---|---|
| 2,214,334 | 9/1940 | Knight, Jr. | 144/34 E |
| 2,529,934 | 11/1950 | Gracey et al. | 144/34 E |
| 3,364,964 | 1/1968 | Lacey | 144/34 E |
| 3,503,429 | 3/1970 | Whisler | 144/34 E |
| 3,880,216 | 1/1975 | Anderson | 144/34 E |

Primary Examiner—Othell M. Simpson
Assistant Examiner—W. D. Bray

[57] ABSTRACT

A shearing device is disclosed for severing trees and the like. The device is vehicle mounted, preferably on the front of a tractor, so that forward movement of the tractor causes shearing of a tree in contact with the device. The device includes a frame member with a pair of forwardly extending spaced arms one of which has a pivot member mounted thereon, with the pivot member carrying a severing element that can be moved in an arc toward and away from the other arm of the frame member. A tree brought into contact with the severing element will be severed as the severing element is caused to move toward the other arm of the frame member due to continued forward movement of the vehicle. After a tree has been severed, the pivot member is preferably biased to automatically return to normal position near the end of the arms of the frame member with the severing element at least partially spanning the space between the arms. Each tree sheared falls rearwardly and to one side in substantially the same manner and direction.

15 Claims, 8 Drawing Figures

TREE SHEARER

BACKGROUND OF THE INVENTION

This invention pertains to a shearing device, and, more particularly, relates to a vehicle mounted tree shearing device.

It is oftentimes desirable that a relatively simple device be available to sever objects such as trees. While trees might be individually cut, as by a saw, this is both time and labor consuming, and hence it is desirable that a device be provided to quickly and safely sever trees with the device preferably being relatively simple both in construction and operation.

While devices have heretofore been suggested and/or utilized for cutting or severing trees, such devices have not proved to be completely successful due to such diverse reasons as being unduly complicated, of expensive construction, unreliable in operation, and/or being operationally slow.

U.S. Pat. No. 2,793,486 shows, for example, a harvester for stalk type crops, such as tobacco, wherein stalks are guided into a recess formed by spaced arms, but the device utilizes a driven rotary type cutter. In like manner, U.S. Pat. No. 3,364,964 shows a severing apparatus for cutting trees and the like, but a cutting disk that comprises a horizontal circular blade is utilized.

U.S. Pat. No. 3,529,641 shows a tree shearing assembly, but the cutter blade utilized is moved by a cylinder and piston arrangement. In like manner, U.S. Pat. Nos. 3,482,614, 3,626,477 and 3,627,002 show felling or severing devices wherein a member is pivoted by a cylinder and piston arrangement, while U.S. Pat. No. 3,612,115 shows a pivot member with a saw element thereon.

U.S. Pat. Nos. 2,529,934 and 2,214,334 show a cutter attachment for tractors wherein a pair of cutters are pivoted for movement toward one another, but such movement depends upon movement of a guide plate to cause both cutters to be simultaneously moved toward one another.

Thus, the problem of providing a relatively simple yet dependable shearing device that does not depend upon closing movement between a pair of cutters, saw elements, and/or power driven cutters has remained unsolved at least in some appreciable measure.

SUMMARY OF THE INVENTION

This invention provides a relatively simple yet dependable device that is well suited for severing of objects such as trees. The shearing device of this invention does not require driven cutting elements, but instead depends only upon continued movement of the device after tree contact has been established in order to sever the tree.

It is therefore an object of this invention to provide an improved shearing device.

It is another object of this invention to provide an improved shearing device that is simple yet dependable.

It is still another object of this invention to provide an improved shearing device that is useful for severing trees.

It is yet another object of this invention to provide an improved shearing device that severs an object by movement of the device and does not require power driven cutters.

It is still another object of this invention to provide an improved shearing device that is vehicle mounted and requires only the movement of the vehicle to sever a tree in contact with the shearing device.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as some within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE PREFERRED EMBODIMENT

Figure 1:
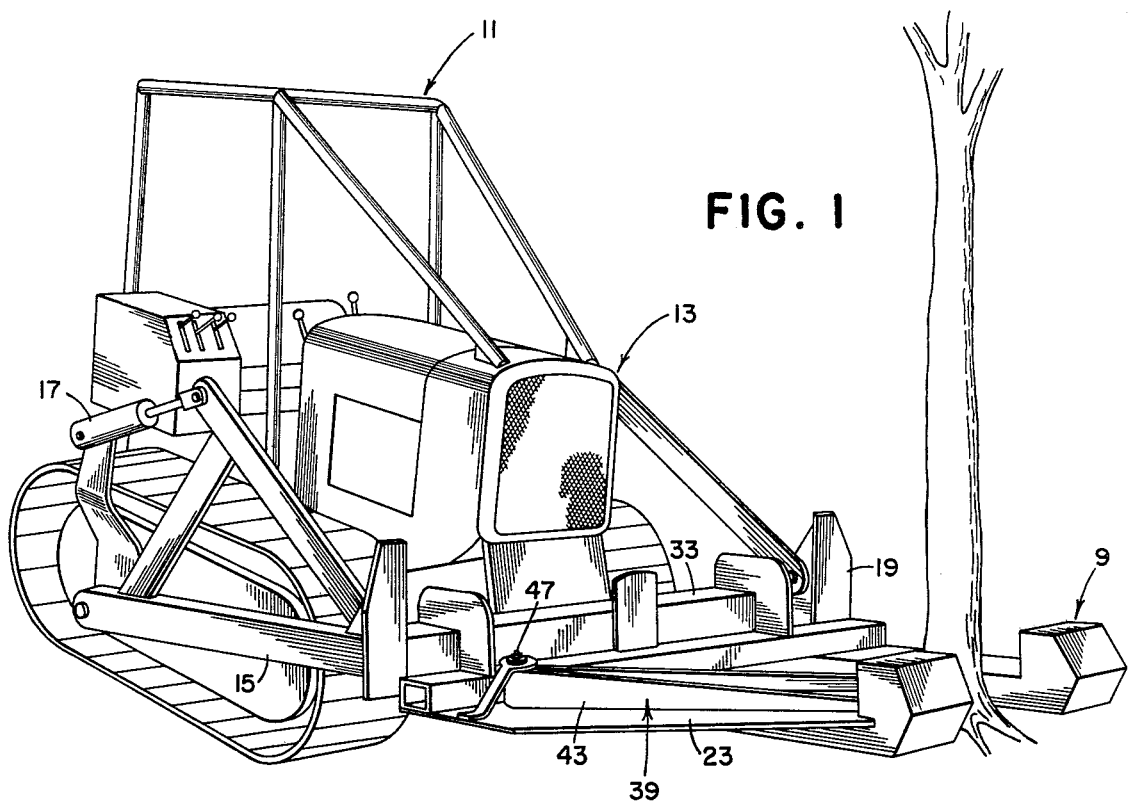
FIG. 1 is a front perspective view of a tractor having the shearing device of this invention mounted thereon.

Referring now to the drawings, shearing device 9 of this invention is shown mounted on a vehicle, or tractor 11. Tractor 11 may be conventional and includes a front portion 13 to which the shearing device 9 is preferably mounted. As indicated in FIG. 1, tractor 11 can include a conventional movable frame 15 that can be raised and lowered by means of hydraulic cylinder assemblies 17. By mounting the shearing device 9 on movable frame 15, the shearing device can be vertically positioned or adjusted as desired, as well known in the art. As also indicated in FIG. 1, a guide and protective bar 19 is preferably mounted on tractor 11 to direct a severed tree to the side of the tractor 11.

Shearing device 9 includes a frame member 21 which has arms 23 and 25 which extend in the same predetermined direction. As shown in FIG. 1, when mounted on the forward portion of the tractor, arms 23 and 25 extend forwardly from the tractor to receive a tree to be severed between the two arms as the tractor is moved forwardly.

Figure 2:
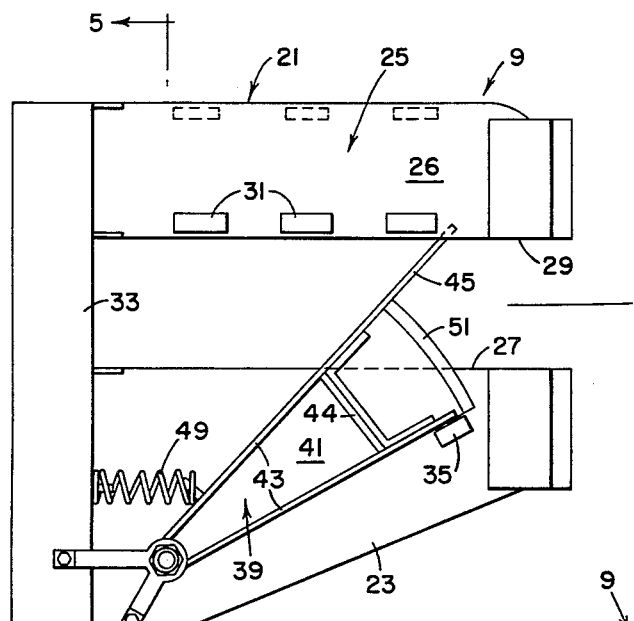
FIG. 2 is a plain view of the shearing device of this invention.
Figure 3:
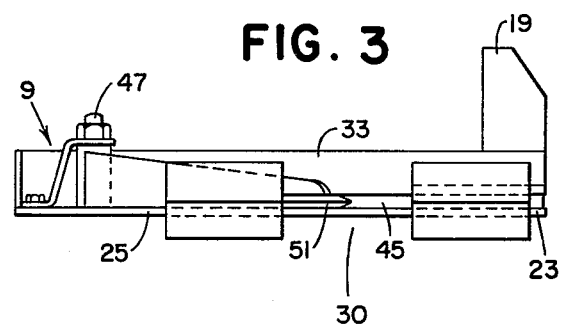
FIG. 3 is a front elevation view of the shearing device of this invention.
Figure 4:
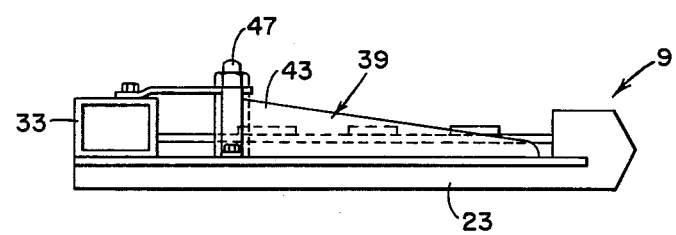
FIG. 4 is a side elevation view of the shearing device of this invention.
Figure 5:
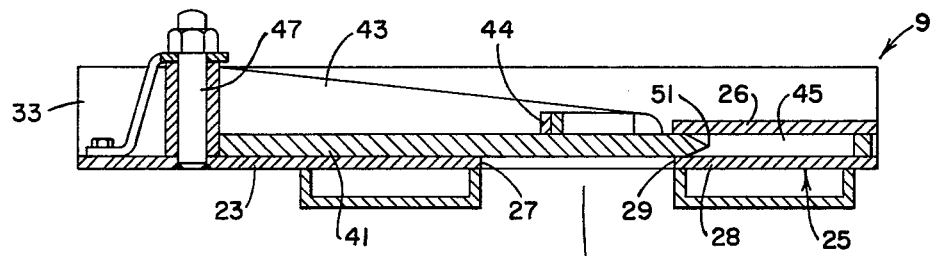
FIG. 5 is an enlarged sectional view taken along line 5—5 of FIG. 2, but with the shear structure position as shown in FIG. 8.

Arm 23 is preferably a flat plate of triangular configuration, while arm 25 may consist of a pair of vertically spaced plates 26, 28 of substantially rectangular configuration. Arms 23 and 25 have facing edges 27 and 29, respectively, defining a recess therebetween. As shown best in FIG. 2, edges 27 and 29 are preferably substantially parallel with respect to one another to form a substantially rectangular recess 30 therebetween. As shown in FIGS. 2 and 3, a plurality of protuberances 31 may be spaced along arm 25 near edge 29. While not shown in detail, it should be understood the frame member 21 may be mounted on the tractor for some slight lateral shifting. By so doing the edge 29 may be operated as an anvil against a tree when the frame shifts during a shearing operation. The shifting feature may be locked out.

Frame member 21 also includes a rear mounting portion 33 extending substantially normal to arms 23 and 25 and utilized for mounting the frame member on the front of a tractor or the like. Mounting of frame member 21 on a tractor is conventional.

Near the free end of the arm 23 (that is, at the end opposite to mounting portion 33), is mounted a shoulder 35. Shoulder 35 on arm 23 acts as a stop to define the normal, or open, position of pivot member 39 mounted on arm 23.

Pivot member 39 includes a flat plate 41 contiguous to the upper surface of arm 23 and preferably has strengthening ribs 43 protruding upwardly therefrom. A cross rib 44 may also be provided to add strength to the pivot member. A guide 45 extends from one of the ribs 43, and as shown in FIGS. 2 and 3, this guide can extend into the slot between the two spaced plates 26, 28 forming arm 25, if desired.

One end of pivot member 39 is mounted for pivotal movement with respect to arm 23 by means of pivot bolt 47. Spring 49 connected between arm 23 and pivot member 39 biases the pivot member to the normal, or initial, position so that one side of the pivot member is in contact with stop shoulder 35.

A cutter or severing edge 51 is connected to pivot member 39 near the free end thereof (i.e., the end opposite to that in contact with pivot bolt 47). As shown best in FIG. 3, in the normal position cutting edge 51 extends partially across recess 31 near the opening in the recess formed by arms 23 and 25, so that a tree or other object received within the recess will come into contact with edge 51. Guide 45 prevents an object such as a tree from by-passing cutter 51 when such an object is moved rearwardly within the recess.

Figure 6:
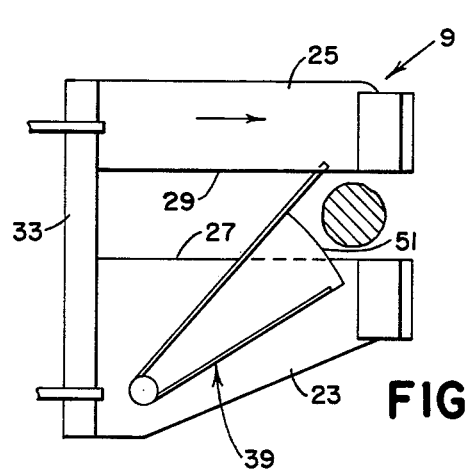
FIGS. 6, 7, and 8 are plan views showing, somewhat in schematic, showing initial tree contact, partial severing of a tree, and complete severing of the tree utilizing the shearing device of this invention.

In operation, the shearing device of this invention is preferably vehicle mounted, such as on a tractor as indicated in FIG. 1. The tractor is then moved forwardly, and the tree or other object to be severed is guided into recess so that the tree comes into contact with cutter edge 51 of pivot member 39. In some instances the tree may first contact guide 45. This initial contact is shown in FIG. 6 of the drawings. As the tractor continues to move forward, the tree causes the pivot member 39 to pivot about pivot bold 47 so that cutter edge 51 is moved in an arc toward edge 29 of arm 25. Since the tree is at this time stationary, the tree will be between the cutter and edge 29 and will be severed as continued movement of the vehicle in the predetermined direction (forwardly, where attached to a front of a tractor) is continued.

Figure 7:
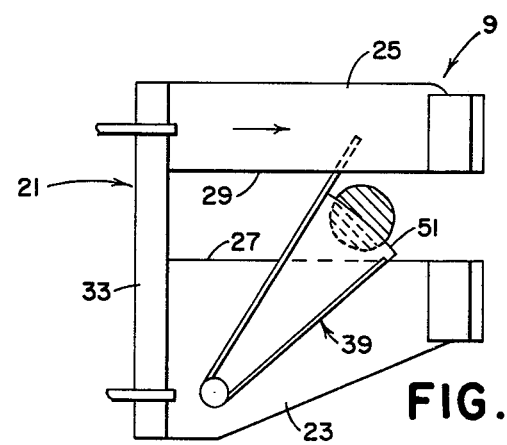
Figure 8:
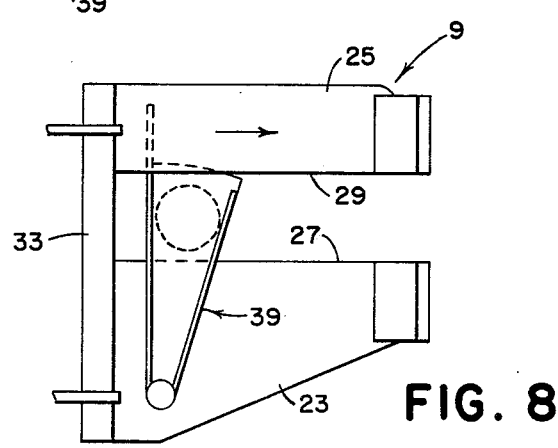

FIG. 7 shows a tree partially severed by movement of the vehicle, and FIG. 8 shows complete severing of the tree as the cutter 51 is brought into a position contiguous to edge 29 of arm 25. Due to the bias on the pivot member 39, after the tree has been severed, the pivot member 39 will be automatically urged back to its initial, or normal, position by means of spring bias 49. After pivot member 39 has regained its normal position, the shearing device is, of course, ready to be brought into contact with another object to sever the same.

Since the object to be severed is continuously urged by cutting edge 51 toward and in contact with edge 29 of arm 25, the cutting of each object is accomplished in substantially the same manner, with the result that the severed object is caused to fall rearwardly and into contact with guide and protective bar 19 so that the severed trees fall consistently to the same side, so that a consistent manner and direction of fall can be therefore maintained the same.

In view of the foregoing, it is apparent that this invention provides an improved shearing device that is particularly useful for shearing of trees and the like.

I claim:

1. A tree shearing device, comprising: a rigid frame member having fore and aft extending and transversely spaced edges defining a forwardly opening tree-receiving recess therein at a shearing area; a pivot member supported on vertical axis structure fixedly mounted on said frame member and having severing means including a forwardly facing severing edge extending diagonally into said recess from one of the fore and aft extending frame edges for engaging trees received in said recess as said frame member advances to thereby cause said severing edge to be moved toward the other of said edges defining said recess and completely across the recess; and horizontal guide means on the frame adjacent the other of said edges receiving a portion of said pivot member.

2. The tree shearing device of claim 1, wherein said device includes means for attaching said frame member to a tractor, said tractor causing movement of said frame member in said predetermined direction.

3. The tree shearing device of claim 2, wherein said attaching means mounts said frame member on the front of said tractor with said recess in said frame member opening in a forwardly direction so that forward movement imparted to said frame member by said tractor causes a tree brought within said recess to be sheared upon continued forward movement of said tractor.

4. The tree shearing device of claim 1, wherein said frame member includes a pair of rigid arms each of which includes one of said edges defining said recess, said pivot member being mounted on one of said rigid arms for pivoting about a pivot spaced from said recess defined by said edges.

5. The tree shearing device of claim 4, wherein said edges defining said recess are substantially parallel with one another to form a substantially rectangular recess.

6. The tree shearing device of claim 1, wherein said severing means is normally positioned near the open end of said recess defined by said frame member and is moved therefrom toward one of said edges by contact with a tree and subsequent movement of said frame member.

7. The tree shearing device of claim 6, wherein said device includes means to bias said severing means to a normal position near the open end of said recess.

8. The tree shearing device of claim 7, wherein said device also includes stop means on said frame member to establish said normal position of said pivot member.

9. A vehicle mounted tree shearing device, comprising: a frame member having a pair of forwardly extending spaced arms and a mounted portion for mounting said frame member on the forward portion of a vehicle; a shearing member having opposite ends, one end of said shearing member defining means for pivotally mounting said hearing member near one end and on one of said arms of said frame member; the other end of said shearing member extending beyond said one arm toward said other arm; severing means on said other end of said shearing member radially spaced from said mean for mounting said shearing member whereby forward movement of said vehicle after tree contact is established by said severing means causes pivotal movement of said pivot member to bring said severing means toward the other of said arms to sever a tree therebetween.

10. The vehicle mounted tree shearing device of claim 9, wherein trees sheared by said severing means are caused to fall rearwardly and to one side in substantially the same manner.

11. A tree shearing device adapted to be mounted on a vehicle for forward movement therewith comprising a generally horizontal rigid U-shaped frame having a transverse rear portion and a pair of forwardly directed leg portions defining therebetween a forwardly directed tree-receiving opening; a vertical pivot carried on the frame offset to one side of the opening; a shear structure mounted on the pivot and having a portion thereof extending diagonally forwardly therefrom to a cutting edge extending at least partially across said opening said portion being disposed in a manner such that the cutting edge engages standing trees that pass in said opening as said vehicle advances, said portion of the shear structure being of such length that said cutting edge transverses said opening as the portion is swung rearwardly by trees in the opening and upon advancement of the vehicle; and an extension on the shear structure that engages and is guided on the leg portion of said frame that is on the side of the frame opposite the pivot.

12. The invention defined in claim 11 characterized by the extension having a forward edge extending diagonally forwardly across the opening and forms with the cutting edge a forwardly opening V-shaped pocket across the tree receiving opening.

13. The invention defined in claim 12 further characterized by a tree guide structure that is fixed to the frame rearwardly of the shear structure and on the opposite side of said opening than said pivot and which engages falling trees sheared by the shear structure and guides them to a side of the vehicle.

14. A tree shearing device for use with a vehicle for forward movement therewith comprising a generally horizontal rigid frame having a transverse rear portion and a pair of forwardly directed leg portions defining therebetween a forwardly directed tree-receiving opening; a vertical pivot carried on the frame offset to one side of the opening; a shear structure mounted on the pivot and having a portion thereof extending diagonally forwardly therefrom to a cutting edge extending at least partially across said opening, said cutting edge being radially spaced from said pivot and engaging standing trees that pass in said opening as said vehicle advances, said portion of the shear structure being of such length that said cutting edge traverses substantially completely across said opening as the portion is swung rearwardly by trees in the opening and upon advancement of the vehicle; and means mounting the frame on the vehicle for lateral shifting motion whereby the edge of the leg portion facing the cutting edge operates as an anvil against which trees may bear.

15. A tree shearing device, comprising: a frame member having edges defining a recess therein at a shearing area; a pivot member mounted on said frame member so that a portion of said pivot member is adjacent to said recess and within said shearing area; severing means mounted on said portion of said pivot member, whereby movement of said frame member in a predetermined direction causes said severing means to be moved toward one of said edges defining said recess so that a tree between said severing means and said one edge is sheared by continued movement of said frame member in said predetermined direction; and a guide member rigid with the pivot member and protruding outwardly from one edge of said severing means to assure pivoting of said pivot member when in contact with a tree.

* * * * *

UNITED STATES PATENT OFFICE
CERTIFICATE OF CORRECTION

Patent No. 4,044,804　　　　　Dated　30 August 1977

Inventor(s) Wesley Lamar Dodd

It is certified that error appears in the above-identified patent and that said Letters Patent are hereby corrected as shown below:

Column 4, line 64, delete "hearing" and insert --shearing--.

Signed and Sealed this

Sixth Day of June 1978

[SEAL]

*Attest:*

RUTH C. MASON
*Attesting Officer*

DONALD W. BANNER
*Commissioner of Patents and Trademarks*